(12) United States Patent
Mostert

(10) Patent No.: US 8,720,371 B2
(45) Date of Patent: May 13, 2014

(54) METHOD FOR MILKING AN ANIMAL, AND MILKING ARRANGEMENT

(75) Inventor: Gerard Mostert, Schipluiden (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/528,859

(22) Filed: Jun. 21, 2012

(65) Prior Publication Data

US 2012/0325153 A1 Dec. 27, 2012

(30) Foreign Application Priority Data

Jun. 27, 2011 (NL) ...................................... 1038898

(51) Int. Cl.
*A01J 3/00* (2006.01)
(52) U.S. Cl.
USPC ........................................................ 119/14.2
(58) Field of Classification Search
USPC .................... 119/14.01, 14.02, 14.08, 14.18
See application file for complete search history.

(56) References Cited

FOREIGN PATENT DOCUMENTS

| | | |
|---|---|---|
| EP | 0774203 A1 | 5/1997 |
| WO | 9636212 A1 | 11/1996 |
| WO | 2007100280 A1 | 9/2007 |
| WO | 2010023112 A2 | 3/2010 |
| WO | 2011014064 A2 | 2/2011 |

OTHER PUBLICATIONS

Dutch Search Report No. SN 56902 with English translation and Written Opinion of Dutch Patent Application No. 1038898 issued on Feb. 17, 2012.

*Primary Examiner* — Kimberly Berona
*Assistant Examiner* — Jessica Wong
(74) *Attorney, Agent, or Firm* — Hoyng Monegier LLP; Coraline J. Haitjema; David P. Owen

(57) ABSTRACT

A method of and arrangement for automatically milking an animal by use of an automatic milking system including a plurality of teat cups, a robot arm for automatic attachment of the teat cups and a control system arranged to control the milking system, wherein the teat cups are used, until a defect is established with respect to a teat cup. In that case, milking of the non-milked teat is automatically taken over by a different teat cup.

25 Claims, 2 Drawing Sheets

METHOD FOR MILKING AN ANIMAL, AND MILKING ARRANGEMENT

CROSS REFERENCE TO RELATED APPLICATIONS

This application claims priority from Netherlands application number 1038898 filed on Jun. 27, 2011, and which is hereby incorporated by reference in its entirety.

BACKGROUND OF THE INVENTION

1. Field of the Invention

The present invention relates to a method for milking an animal, with the use of an automatic milking system comprising a plurality of teat cups, a robot arm for automatic attachment of the teat cups and a control system arranged to control the milking system 2. Description of the Related Art In general, such a method of milking is known from a number of milking robots. A disadvantage of these known methods is that valuable milking time may be lost when a malfunctioning teat cup is detected, especially when there is no operator readily at hand. Since automatic milking does not require direct human supervision, having an operator nearby during milking would strongly diminish the advantage of automatic milking, and is therefore no option.

BRIEF SUMMARY OF THE INVENTION

It is an object of the present invention to improve the known method, in particular to reduce the lost milking time and to thereby improve the efficiency of the milking method.

The present invention achieves this object with a method for milking dairy animals, with the use of an automatic milking system comprising a plurality of teat cups, a robot arm for automatically attaching the teat cups to teats of the animal and a control system arranged to control the milking system. The method comprises: milking one or more animals in a normal milking mode according to a normal, proper milking process, until it is determined that the milking system exhibits a malfunction which, for at least one teat cup but fewer than all the teat cups, would impede the proper milking process, switching to milking one or more animals in a special milking mode, until it is determined that the milking system no longer exhibits a malfunction which, for at least one teat cup but fewer than all the teat cups, would impede the proper milking process, and then switching back to milking in a normal milking mode, wherein the normal milking mode according to a normal, proper milking process comprises: attaching the teat cups to all respective teats of the milking animal with the robot arm, milking milk from all the teats until, in particular per individual teat cup, a first detachment criterion is fulfilled. The special milking mode comprises: milking milk from the teats, except for at least one unfinished or unmilked teat intended to be milked with the at least one malfunctioning teat cup, with the remaining, unaffected teat cups, using a remaining, unaffected teat cup for milking the at least one unfinished or unmilked teat. According to this method, the milking process can continue even with a malfunctioning teat cup, since its function is replaced by one of the remaining teat cups. In other words, although there are (precisely) enough teat cups for each teat of the dairy animal to be milked simultaneously in the normal milking process, the malfunctioning teat cup is taken or left out of operation, and the teat that should have been milked with that malfunctioning teat cup is (subsequently) milked with one of the other cups. Although milking will of course be slower than with a normal, proper milking process, it can at least continue for all teats. This is a big advantage for milking animals, since milk production, which is more or less independent for the individual "quarters" of an udder (halves with a.o. goats), will not be impeded by not milking that quarter for too long a time. In other words, valuable time is won for an operator to come to the machine performing the milking, for repairing the malfunctioning teat cup. One could say that the milking of the unmilked, or at least unfinished, teat is taken over by one of the properly milking teat cups. The present invention then allows an operator more freedom, e.g. when going away from the milking farm.

In the present invention, "proper milking process" means a milking process which is not impeded by a teat cup in which a malfunction is detected, and in which all teat cups still have the possibility to milk its corresponding teat until the first detachment criterion, i.e. the proper or normal detachment criterion, is fulfilled. Note that not all milkings need to succeed until this criterion is fulfilled. For example, a teat cup can be kicked off at a relatively late stage of milking, such that the milking controller decides not to reattach the teat cup. For the teat, milking then ends without the detachment criterion being fulfilled. But this does not arise due to a malfunctioning of the teat cup, and in a subsequent milking, that criterion may still or again be fulfilled. But certainly when the malfunctioning teat cup prevents the first detachment criterion from being fulfilled, proper milking is no longer possible.

When said malfunction is determined when the teat cup is not attached to a teat, attachment of that teat cup may be prevented during milking in the special mode. By preventing attachment of that teat cup during milking in the special mode, a superfluous action is avoided, which decreases the risk of unrest for the animal. Note, however, that it is also possible to still attach the teat cup to the teat. In this case, one still has the possibility that the teat cup could turn out to function after all. The decision whether or not to attach a teat cup which is deemed to malfunction, may be made dependent on the type of malfunction determined.

In another embodiment, there may be more than one malfunction determined. Once determined, the milking process will switch into the special milking mode. The milking process will not be switched back into normal mode until the milking system no longer exhibits any malfunction which would impede the proper milking process for any teat cup.

In yet another embodiment, when said malfunction is determined for a teat cup when it is attached to a teat, said malfunctioning teat cup is detached before said first criterion is fulfilled. By detaching the malfunctioning teat cup, valuable time is won for attaching one of the remaining teat cups.

In particular, milking with the remaining, unaffected teat cups in special mode comprises milking until for a remaining teat cup a second detachment criterion is fulfilled. This feature provides the possibility to use a different detachment criterion for the remaining teat cup that is to be used instead of the malfunctioning teat cup.

In another embodiment, milking the at least one unfinished or unmilked teat comprises:

detaching said first remaining teat cup, attaching said first remaining teat cup on the unfinished or unmilked teat with the robot arm, milking milk from the unfinished or unmilked teat with said first remaining teat cup until a third detachment criterion is fulfilled.

The first two steps relate of course to standard steps for robotic milking, but now applied to the teat cup that is to fulfil a double function. Furthermore, this feature also provides the possibility to milk the unfinished or unmilked teat with a different detachment criterion. For the purpose of the present invention, an unfinished or an unmilked teat will be treated the same, wherein an unfinished teat relates to a teat that was milked with a teat cup that was determined to malfunction during milking, while an unmilked teat relates to a teat for which milking with the malfunctioning teat cup did not even start.

In yet another embodiment, the second and/or the third detachment criterion equals/equal the first detachment criterion. In this embodiment, each udder part/teat will in the end be milked according to a detachment criterion that is the same in all situations, although that criterion may be different from teat to teat. In other words, if the milking process is going properly, a teat will be milked according to the first or normal detachment criterion. If there is a malfunctioning other teat cup, still the same criterion applies to the normal milking teat, while in case the teat itself cannot be milked normally due to a malfunctioning teat cup, it will be milked by a well-functioning teat cup after finishing the milking of the corresponding other teat and according to still the same detachment criterion. An advantage of this set-up is that the optimum criterion still applies for all teats, and no changes have to be made to the milking controller.

It is remarked here that "detachment criterion" is deemed equivalent with any criterion used to end the milking of the udder part, such as "milking criterion" and so on.

In an alternative embodiment, the second and/or the third detachment criterion are such that the milking duration for the associated teat is less than for the first detachment criterion. This allows the total milking time for the milking animal involved to be shorter than with unchanged detachment criteria. Note that only the teat cup that is or will be detached first need be subjected to the second detachment criterion. For the other teat cups, the less strict first criterion may be applied, or an even less strict amended first criterion, since the total milking time for the animal will in most cases be prolonged anyway. Having a stricter third criterion, to be applied to the unmilked/unfinished teat, also shortens the total milking time, since in most cases, milking as a whole will be ended when the milking of that teat is ended. Note that switching from a first to a second detachment criterion is deemed equivalent to adjusting the relevant detachment criterion such that the milking duration for the associated teat is less than for the first detachment criterion.

In a further embodiment, the method comprises measuring a milkflow from the teat cup, wherein the first detachment criterion comprises that the milkflow from said teat falls below an associated first threshold value, wherein the second detachment criterion comprises that the milkflow falls below a second threshold value, wherein the second threshold value is higher than the first detachment criterion. This is a simple and reliable way to make the detachment criterion stricter, as a milkflow rate curve will most often show a peak early in milking, and then a gradual decrease, so that milking ends earlier when a higher threshold is used. Note that all known additional measures, like using a running average or detaching only when the milkflow rate is below the threshold during a predetermined period of time, are deemed part of the invention. With "milkflow from the teat cup" is meant not only a measurement carried out in the milk line connecting the teat cup to a storage vessel (milkjar), but also any measurement to establish the corresponding quantity. The milkflow may also be determined e.g. directly at the teat, but since that physical quantity is in principle the same as the milkflow determined from the teat cup, these are considered equivalent. This physical quantity is called milkflow in the present application. It is expressed in mass or volume per unit time, such as kg/minute or liters/minute. Note that milkflow and milkflow rate are considered equivalents in the present application. In case an actual quantity of milk (i.e. a number of kilograms, liters etc.) is intended in the present invention instead of a flow (rate), the term yield will be used.

In another embodiment, the method comprises measuring a milkflow from the teat cup, wherein the third detachment criterion comprises that the milkflow from said teat falls below a third threshold value, wherein the third threshold value is higher than said first threshold value, and preferably higher than said second threshold value. By using such threshold values, it is ensured that at least the milking of the teat milking out first will be shorter than in the normal, "proper" milking process, so that the milking of the unmilked/unfinished teat can start earlier. Furthermore, by having a high(er) third threshold value, milking of that unmilked/unfinished teat will take as short a time as possible or desired, at least shorter than normal.

In a further embodiment, the third detachment criterion comprises that the milking of the unfinished teat takes place during a threshold milking time. This means that a milking time is applied for milking the unmilked/unfinished teat. Such a measure allows a good control over the total milking time, as the milking of that last teat cannot prolong the total milking time beyond that threshold milking time, while still ensuring that the teat is milked at least to some degree, be it possibly not to an optimum degree. In this way, a good combination of udder health and milking machine efficiency is obtained.

In particular, the threshold milking time is a predetermined length of time, or a length of time from the moment of attachment onto the unfinished teat up to and including a predetermined time duration after detachment of all remaining, properly milking teats. Having a predetermined threshold milking time sets a maximum to the total milking time for the animal in a very simple way, in this way ensuring a good efficiency of the milking process. By alternatively using a more flexible period, that only extends beyond the milking of the other teat cups for a predetermined period of time, also allows good control over the total milking time of the animal, but also allows to milk out the unfinished/unmilked teat as far as possible within a reasonable time frame. In case a first teat is milked out very quickly, e.g. by applying a rather strict detachment criterion, there will be more time for the unfinished/unmilked teat to be milked, ensuring a relatively good milking out of that teat too.

In yet another embodiment, in particular determining whether the milking system exhibits a malfunction is performed by the control system. Hereby, fully automatic operation of the milking system in still ensured. Various ways of determining the malfunction are known, and will be discussed below. Note however, that it is also possible for an operator to determine the malfunction. In that case, the operator may switch the milking system to the special mode.

In one embodiment, a method according to the instant invention includes the step of determining that the milking system exhibits a malfunction comprises determining that for a predetermined number of consecutive milkings of the concerned teat cup the milkflow from that teat cup remains below a milking threshold, also in particular after a reattachment attempt during one or more of the milkings, while for each of said milkings the milking threshold is reached by at least one and preferably all remaining teat cups, wherein said number in particular is at least two. In this way, a malfunction is established when for any reason whatsoever, a milking threshold is not reached. Since milking is only useful if such a threshold can be reached in at least some milkings, establishing a malfunction may be based on not reaching the milking threshold for a predetermined number of consecutive milkings. Furthermore, if at least one other teat cup reaches the milking threshold, that indicates that there is an animal being milked, so that there must be a reason why milking with the affected teat cup did not succeed. There can be various reasons, such as a three teated cow, early and repeated teat cup kick-off, a folded teat and so on. The likelihood of this happening more than a certain number of times in a row is not very great, so that a reliable decision can be taken on this basis. Note that the predetermined number may be taken according to one's liking. In most cases, however, the number should be at least two. Furthermore, it is still possible, e.g. dependent on the type or severity of the malfunction, to at least try to connect the teat cup to the teat and to try milking.

Alternatively or additionally, the step of determining that the milking system exhibits a malfunction comprises determining that either a desired milking vacuum is not reached, or a pulsator malfunction signal is generated by the control system. Every automatic milking system has a vacuum source producing the milking vacuum, and a vacuum source producing a pulsating vacuum. If the corresponding vacuum sensors, or other operative sensors, measure a deviant signal, indicating that the respective vacuum is not reached, or if the pulsator is not functioning correctly, then it can also be determined that the milking system exhibits a malfunction for a particular teat cup. Reference is made to e.g. WO2007/100280, and the documents referred to therein, as prior art describing some methods of testing a milking machine, all of which is hereby incorporated by reference hereby in its entirety. Of course, any other known method of determining a malfunction with respect to a teat cup is also encompassed.

Advantageously, the method comprises generating an attention signal concerning the malfunction, in particular additionally transmitting the signal to an operator. Hereby, the automatic system warns an operator to take corrective action. For example, the malfunctioning teat cup may be replaced or repaired. The attention signal may also be stored for later use, or may be transmitted to a mechanic for repairing the milking system.

In case it turns out that the malfunction is corrected "naturally" or turned out to be only temporary, switching back to normal milking operation can be performed automatically.

In a particular embodiment, the robot arm comprises a teat detection system with a substantially horizontal teat detection direction, and wherein:

when the malfunctioning teat cup is located rearwardly as seen in the teat detection direction, the teat cup located in front of the malfunctioning teat cup, as seen in the teat detection direction, is selected as the remaining teat cup to be attached instead of said malfunctioning teat cup, and when the malfunctioning teat cup is located in front as seen in the teat detection direction, the teat cup located behind the malfunctioning teat cup or, and preferably, next to the malfunctioning teat cup and in front, as seen in the teat detection direction, is selected as the remaining teat cup to be attached instead of the malfunctioning teat cup. In this embodiment, use is made of a teat detection system with a substantially horizontal teat detecting direction, by which is meant that the teat detection direction is such that one or more teats can be screened from view from the teat detection system. In other words, if a teat detection system looks at the teats from below, or at least such that no screening is present, the present embodiment does not apply. Most teat detection systems, however, look in a more or less horizontal direction, such that screening may take place. In that case, the present embodiment provides the advantage that a particular one of the remaining teat cups is selected for attachment to the unfinished or unmilked teat in order to prevent said unfinished or unmilked teat from being screened by a teat cup that has not yet finished milking. This greatly simplifies the attachment process. Note, that in this case, a stricter detachment criterion need apply only to the selected one of the remaining, unaffected teat cups in order for it to be taken off earlier.

The invention also relates to a milking arrangement with a plurality of teat cups and a robot arm arranged to attach the plurality of teat cups to respective teats of a milking animal, and with a control system arranged to control the milking arrangement, wherein the control system is adapted to perform the method according to the invention, in particular for:

milking one or more animals in a normal milking mode according to a normal, proper milking process, until the control system determines that the milking system exhibits a malfunction which, for at least one teat cup but fewer than all the teat cups, would impede the proper milking process, switching to milking one or more animals in a special milking mode, until the control system determines that the milking system no longer exhibits a malfunction which, for at least one teat cup but fewer than all the teat cups, would impede the proper milking process, and then switching back to milking in a normal milking mode, wherein the normal milking mode according to a normal, proper milking process comprises:

attaching the teat cups to all respective teats of the milking animal with the robot arm, milking milk from all the teats until, in particular per individual teat cup, a first detachment criterion is fulfilled, wherein the special milking mode comprises:

milking milk from the teats, except for at least one unfinished or unmilked teat intended to be milked with the at least one malfunctioning teat cup, with the remaining, unaffected teat cups, using a remaining, unaffected teat cup for milking the at least one unfinished or unmilked teat.

The above milking arrangement provides all the advantages that have been described with respect to the method according to the invention, which advantages therefore are not repeated here. It is understood that parts not explicitly mentioned but required in such an automatic milking arrangement, such as milk lines, a vacuum source and so one, are part of the milking arrangement. It is also noted that the embodiments mentioned as advantageous embodiments of the method are deemed to be similarly advantageous embodiments of the milking arrangement according to the invention. In particular, the control system may be adapted and arranged to perform the method according to any advantageous embodiment as described above, such as with different first and second and/or third detachment criteria. The milking arrangement comprises a signalling device adapted to send an attention signal to a user of the milking arrangement and/or a service mechanic or service company for the milking arrangement if the control system determines said malfunction, wherein the signalling device in particular comprises a telecommunication connection. It is understood that all parts required to be able to determine the malfunction, such as for example sensors and/or an evaluation unit, are also deemed part of the milking arrangement. However, since these parts are not part of the true invention, reference is made to e.g. the prior art documents already mentioned above. Furthermore, although the signalling device in particular comprises a telecommunication connection, such as a mobile phone connection, a blue tooth connection or an internet connection, it is also possible to have as the signalling device an attention list, showing the malfunction only on request by an operator.

In another embodiment, the milking arrangement comprises at least one milkflow rate meter, arranged to measure a milkflow rate from a teat cup, wherein the control system is arranged to control the milking process, and in particular the first, second and/or third detachment criterion, based on the measured milkflow rate, as mentioned above.

BRIEF DESCRIPTION OF THE DRAWINGS

Further particulars of the milking arrangement, as well as of the method according to the invention, will be shown in connection with the drawings, in which.

DESCRIPTION OF ILLUSTRATIVE EMBODIMENTS

The following is a description of certain embodiments of the invention, given by way of example only and with reference to the drawings.

Figure 1:
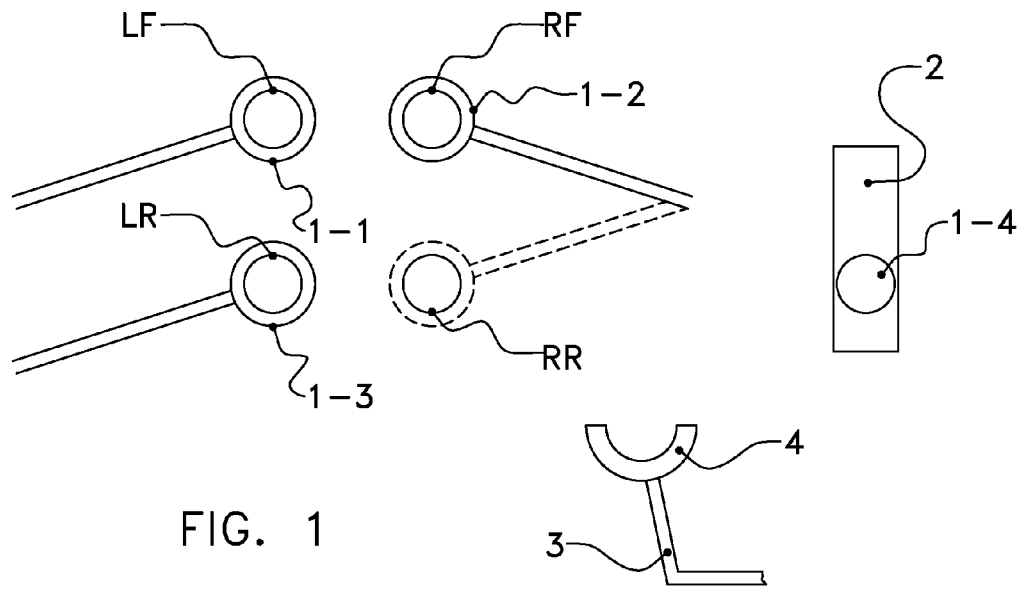
FIG. 1 diagrammatically shows an embodiment of the method of the invention.

FIG. 1 diagrammatically shows an embodiment of the method of the invention, and herein, for teats of a milking cow are indicated as left front (LF), right front (RF), left rear (LR) and right rear (RR), respectively. Onto three teats, three teat cups 1-1, 1-2 and 1-3 have been attached. Teat cup 1-4 was detected to be malfunctioning, and is still in teat cup magazine 2. After finishing milking, teat cup 1-2 is detached from the teat RF, after which the robot arm 3 with the gripper 4 takes teat cup 1-2 and attaches it to teat RR. Thereafter, this teat will also be milked. Although in principle any of the milking teat cups 1-1-1-3 could be used for milking teat RR, in this case teat cup 1-2 is selected, either for ease of gripping or e.g. because this teat cup happened to be milked out first.

Figure 2:
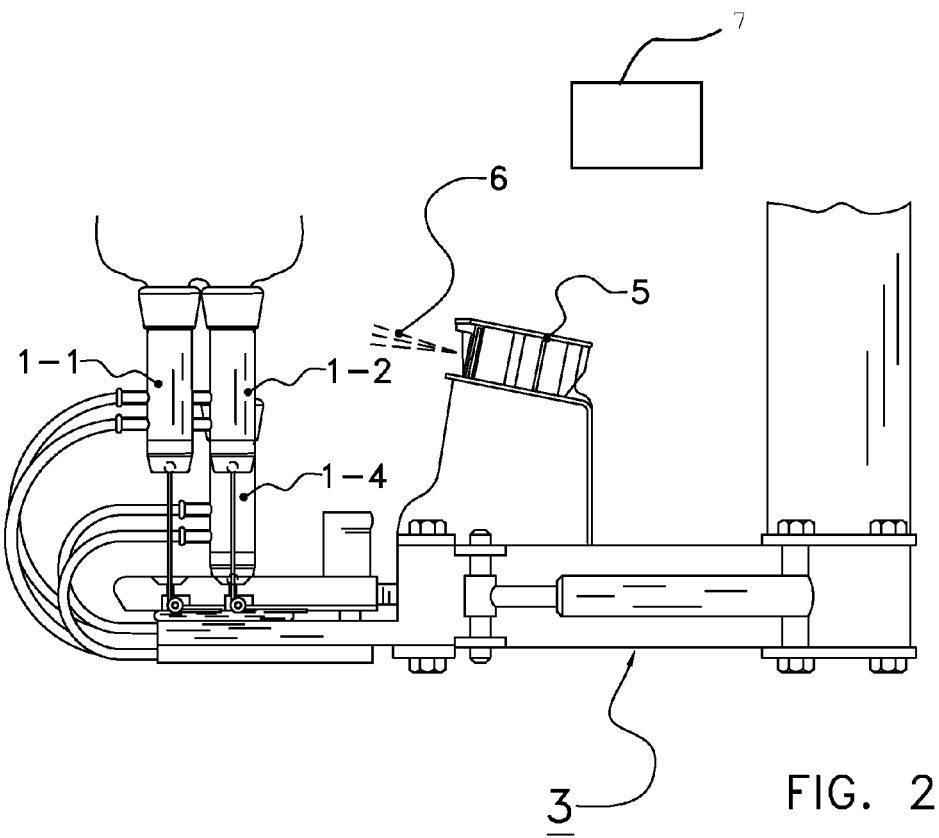
FIGS. 2-4 diagrammatically show a side elevational view of another embodiment of the invention.

FIG. 2 shows a situation in which three teat cups have been attached to teats. Teat cups 1-1 and 1-2 are visible while teat cup 1-4 was determined to be malfunctioning, and has not been attached. Furthermore are visible a robot arm 3 with a teat detection system 5 having a direction of viewing 6. Note that in this case the robot arm carries four teat cups, instead of gripping and attaching each teat cup separately from a magazine.

Figure 3:
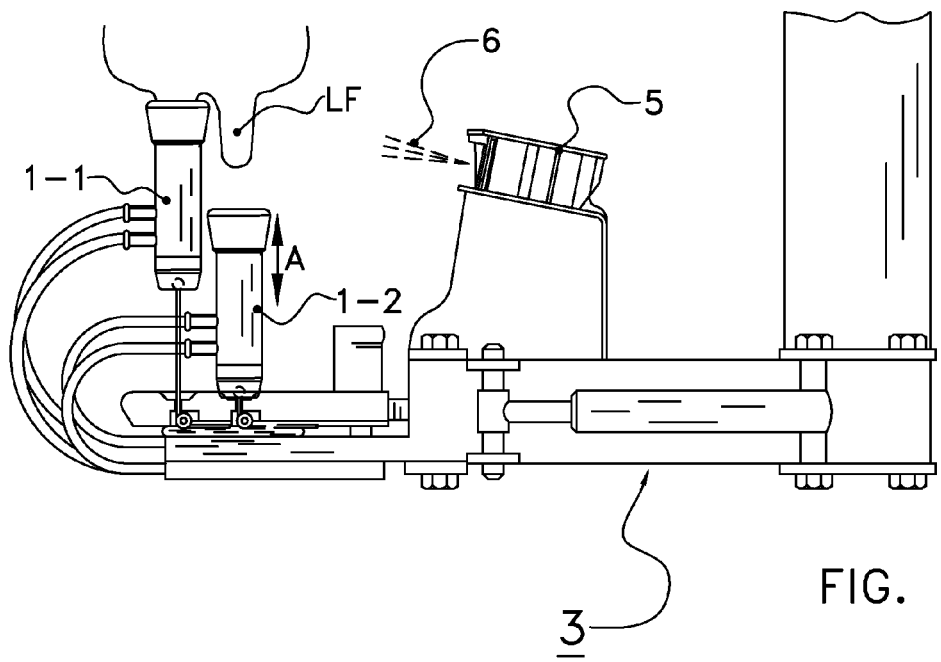
Figure 4:
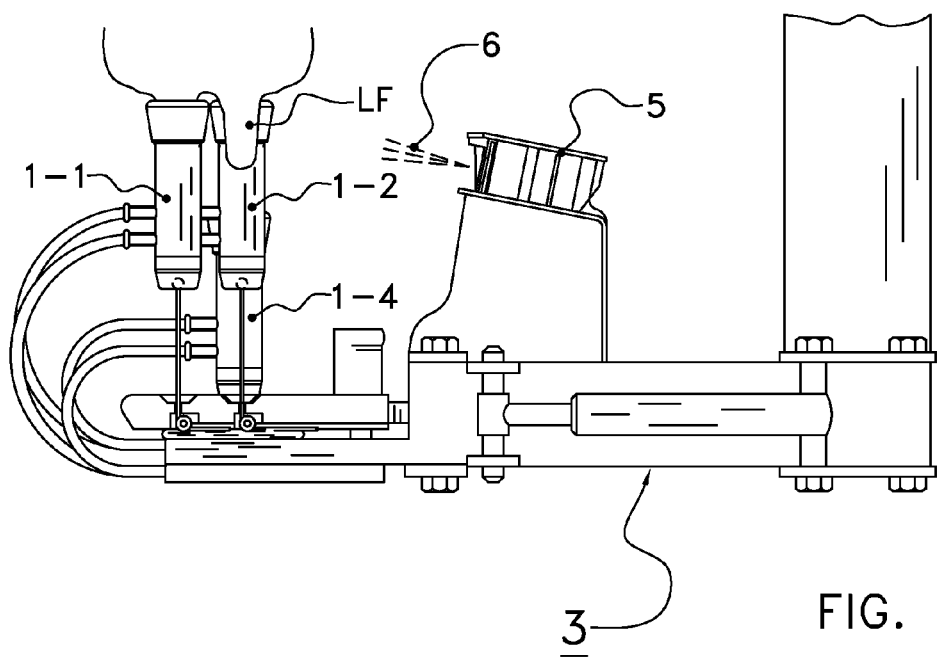

In FIG. 2, it was determined by the control system 7, that the teat cup 1-4 was malfunctioning. For example, there was a vacuum leak. Therefore, this teat cup has not been attached to its corresponding teat. The other three teat cups have been attached, of which teat cups 1-1 and 1-2 are visible. Teat cup 1-3 cannot be seen in the figure as being screened by teat cups 1-1. Note that the numbering in FIGS. 2-4 need not correspond to the numbering in FIG. 1. In FIGS. 2-4, the teat cups 1-1 through 1-4 are connected, in formal milking mode, to teats LR, LF, RR and RF, respectively.

It can also been seen that the direction of viewing 6 of the teat detection system 5 is substantially horizontal, at least such that the left most teat cups, 1-1 and 1-3, could be screened by teat cup 1-2 and, in case it would function, teat cup 1-4. For this reason, it is advantageous if the function of teat cup 1-4 would be taken over by teat cup 1-2, or alternatively by teat cup 1-3. This will be shown in connection with FIGS. 3 and 4.

FIG. 3 diagrammatically shows the situation in which teat cup 1-2 has been disconnected from its teat LF and has been withdrawn onto the robot arm. Now, the robot arm 3, under the guidance of the teat detection system 6 can attach teat cup 1-2 to the as yet unmilked teat RF. This teat is screened in FIG. 3 by the teat LF. For attaching, the teat 1-2 is moved along the direction of arrow A.

The result is visible in FIG. 4, showing teat cups 1-1 and 1-3 still connected to their respective teats, while teat cup 1-2 is now connected to teat RF while teat LF, being finished milking, is now visible, as is teat cup 1-4, which would normally have milked the teat RF.

It is noted that in this case teat cup 1-2 was selected as the teat cup of the remaining teat cups to take over the function of the malfunctioning teat cup 1-4 because the view of this teat cup 1-2 is not screened by other teat cups. Note that the same would have held for teat cup 1-3, but in this example it is assumed that teat LF, corresponding to teat cup 1-2, milked out first. Alternatively, if teat RR would have milked out first, i.e. before teat LF, it would also easily have been possible to let teat cup 1-3 take over the function of malfunctioning teat cup 1-4. This is not so easy for teat cup 1-1.

The embodiments shown are intended to be non-limiting for the invention. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method for milking dairy animals using an automatic milking system, the automatic milking system comprising a plurality of teat cups, a robot arm for automatically attaching the teat cups to teats of the animal and a control system arranged to control the milking system, wherein the method comprises:
   milking one or more animals in a normal milking mode according to a proper milking process until it is determined that the milking system exhibits a malfunction which, for at least one teat cup but fewer than all the teat cups, would impede the proper milking process,
   switching to milking one or more animals in a special milking mode until it is determined that the milking system no longer exhibits the malfunction, and then
   switching back to milking in the normal milking mode, wherein the normal milking mode according to the proper milking process comprises:
   attaching the teat cups to all respective teats of the milking animal with the robot arm,
   milking milk from all the teats per individual teat cup until a first detachment criterion is fulfilled,
   wherein the special milking mode comprises:
   milking milk from the teats, except for at least one unfinished or unmilked teat intended to be milked with the at least one malfunctioning teat cup, with the remaining, unaffected teat cups,
   using at least one remaining, unaffected teat cup for milking the at least one unfinished or unmilked teat.

2. The method according to claim 1, wherein, when said malfunction is determined when at least one teat cup is not attached to at least one teat, preventing attachment of that teat cup during milking in the special mode.

3. The method according to claim 1, wherein, when said malfunction is determined for the teat cup when it is attached to the teat, said malfunctioning teat cup is detached before said first detachment criterion is fulfilled.

4. The method according to claim 1, wherein milking with the remaining, unaffected teat cups in special mode comprises milking until a second detachment criterion is fulfilled for at least one remaining teat cup.

5. The method according to claim 4, wherein milking the at least one unfinished or unmilked teat comprises:
   detaching said first remaining teat cup,
   attaching said first remaining teat cup on the unfinished or unmilked teat with the robot arm,
   milking milk from the unfinished or unmilked teat with said first remaining teat cup until a third detachment criterion is fulfilled.

6. The method according to claim 5, wherein at least one of the second and the third detachment criterion equals the first detachment criterion.

7. The method according to claim 5, wherein at least one of the second and the third detachment criterion are such that the milking duration for the associated teat is less than for the first detachment criterion.

8. The method according to claim 4, comprising measuring a milkflow from the teat cup, wherein the first detachment criterion comprises that the milkflow from said teat cup falls below an associated first threshold value, wherein the second detachment criterion comprises that the milkflow falls below a second threshold value, wherein the second threshold value is higher than the first threshold value.

9. The method according to claim 5, comprising measuring a milkflow from the teat cup, wherein the third detachment criterion comprises that the milkflow from said teat cup falls below a third threshold value, wherein the third threshold value is higher than said first threshold value.

10. The method according to claim 9, wherein the third threshold value is higher than said second threshold value.

11. The method according to claim 5, wherein the third detachment criterion comprises that the milking of the unfinished teat takes place during a threshold milking time.

12. The method according to claim 11, wherein the threshold milking time is a predetermined length of time, or a length of time from the moment of attachment onto the unfinished teat cup to and including a predetermined time duration after detachment of all remaining, properly milking teats.

13. The method according to claim 1, wherein determining whether the milking system exhibits a malfunction is performed by the control system.

14. The method according to claim 13, comprising generating an attention signal concerning the malfunction.

15. The method of claim 14, further comprising transmitting the attention signal to an operator.

16. The method according to claim 1, wherein the step of determining that the milking system exhibits a malfunction comprises determining that for a predetermined number of consecutive milkings via a particular teat cup the milkflow from said particular teat cup remains below a milking threshold.

17. The method according to claim 16, wherein after a reattachment attempt during one or more of the milkings while for each of said milkings the milking threshold is reached by at least one remaining teat cup.

18. The method according to claim 16, wherein the milking threshold is reached for all remaining teat cups.

19. The method according to claim 1, wherein the step of determining that the milking system exhibits a malfunction comprises determining that either a desired milking vacuum is not reached, or a pulsator malfunction signal is generated by the control system.

20. The method according to claim 1, wherein the robot arm comprises a teat detection system with a substantially horizontal teat detection direction, and wherein: when the malfunctioning teat cup is located rearwardly as seen in the teat detection direction, the teat cup located in front of the malfunctioning teat cup, as seen in the teat detection direction, is selected as the remaining teat cup to be attached instead of said malfunctioning teat cup, and when the malfunctioning teat cup is located in front as seen in the teat detection direction, the teat cup located behind the malfunctioning teat cup is selected as the remaining teat cup to be attached instead of said malfunctioning teat cup.

21. The method according to claim 1, wherein the robot arm comprises a teat detection system with a substantially horizontal teat detection direction, and wherein:
   when the malfunctioning teat cup is located rearwardly as seen in the teat detection direction, the teat cup located in front of the malfunctioning teat cup, as seen in the teat detection direction, is selected as the remaining teat cup to be attached instead of said malfunctioning teat cup, and when the malfunctioning teat cup is located in front as seen in the teat detection direction, the teat cup located next and in front to the malfunctioning teat cup is selected as the remaining teat cup to be attached instead of the malfunctioning teat cup.

22. A milking arrangement with a plurality of teat cups and a robot arm arranged to attach the plurality of teat cups to respective teats of a milking animal, and with a control system arranged to control the milking arrangement, wherein the control system is adapted to perform a method comprising:
   milking one or more animals in a normal milking mode according to a normal, proper milking process, until the control system determines that the milking system exhibits a malfunction which, for at least one teat cup but fewer than all the teat cups, would impede the proper milking process,
   switching to milking one or more animals in a special milking mode, until the control system determines that the milking system no longer exhibits the malfunction, and then switching back to milking in the normal milking mode, wherein the normal milking mode according the proper milking process comprises:
   attaching the teat cups to all respective teats of the milking animal with the robot arm,
   milking milk from all the teats per individual teat cup until a first detachment criterion is fulfilled,
   wherein the special milking mode comprises:
   milking milk from the teats, except for at least one unfinished or unmilked teat intended to be milked with the at least one malfunctioning teat cup, with the remaining, unaffected teat cups, using a remaining, unaffected teat cup for milking the at least one unfinished or unmilked teat.

23. The milking arrangement according to claim 22, comprising a signalling device adapted to send an attention signal to a user of the milking arrangement if the control system determines said malfunction.

24. The milking arrangement according to claim 23, wherein the user comprises at least one of: a user of the milking arrangement, a service mechanic, and a service company for the milking arrangement.

25. The milking arrangement according to claim 23, wherein the signalling device comprises a telecommunication connection.

* * * * *